Figure 1:
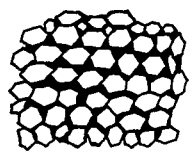

United States Patent [19]

Watanabe et al.

[11] 4,196,267

[45] Apr. 1, 1980

[54] EXTRUSION FOAMED ARTICLE AND PROCESS FOR PRODUCING THE SAME

[75] Inventors: Seizaburo Watanabe; Yuji Seo; Eiji Hattori; Masao Okuda; Hiroshi Watanabe, all of Suzuka, Japan

[73] Assignee: Asahi-Dow Limited, Tokyo, Japan

[21] Appl. No.: 881,785

[22] Filed: Feb. 27, 1978

Related U.S. Application Data

[63] Continuation of Ser. No. 669,495, Mar. 23, 1976, abandoned.

[30] Foreign Application Priority Data

Mar. 25, 1975 [JP] Japan .................................. 50-35758
Oct. 14, 1975 [JP] Japan ................................. 50-123546

[51] Int. Cl.² ........................................... B29D 77/00
[52] U.S. Cl. ....................................... 521/93; 264/53;
264/DIG. 5; 264/DIG. 13; 264/DIG. 18;
428/310; 521/144; 521/146

[58] Field of Search .......... 264/53, DIG. 18, DIG. 5,
264/DIG. 13; 521/93, 142, 143, 144, 146;
428/310

[56] References Cited

U.S. PATENT DOCUMENTS

| | | | |
|---|---|---|---|
| 3,264,272 | 8/1966 | Rees .................................... | 260/78.5 |
| 3,789,035 | 1/1974 | Iwami et al. .................... | 260/78.5 T |
| 3,810,964 | 5/1974 | Ehrenfreund .......................... | 264/53 |
| 3,947,387 | 3/1976 | Lundberg ..................:..... | 264/DIG. 18 |

*Primary Examiner*—Philip Anderson
*Attorney, Agent, or Firm*—Cooper, Dunham, Clark, Griffin & Moran

[57] ABSTRACT

An extrusion foamed article with a large cross-sectional area is made by extrusion foaming a mixture of an ionomer resin and a styrenic resin utilizing a volatile blowing agent. The process permits economic production of a novel thick, foamed article having well balanced properties.

14 Claims, 4 Drawing Figures

EXTRUSION FOAMED ARTICLE AND PROCESS FOR PRODUCING THE SAME

This is a continuation, of application Ser. No. 669,495 filed Mar. 23, 1976 now abandoned.

This invention relates to a method for the extrusion foaming of synthetic resin, which permits economic and continuous extrusion of foamed articles of large and thick cross section. Further, it relates to an economical method for the manufacture of an extrusion foamed article of synthetic resin excelling in flexibility, cushioning properties, resistance to heat and compression creep and other properties.

Methods which effect desired foaming of a polystyrene resin, polyethylene resin, etc. by the steps of mixing the resin with a blowing agent, heating and kneading the mixture and extruding the resultant molten mixture into a zone of decreased pressure enjoy a widespread acceptance. With these techniques for the extrusion foaming of synthetic resins, however, foamed articles having large and thick cross sections cannot easily be obtained. If thick foamed articles are to be produced at all conventional techniques have necessarily been modified to use complicated processing systems having a high capacity extruder and a large screw diameter.

If a cylinder-shaped extrusion foamed article about 150 mm in diameter is to be obtained by extrusion foaming a low-density polyethylene resin, for example, it is found necessary to use a large extruder which is at least 60 mm in screw diameter. The difficulties experienced in the adjustment of extruding conditions owing to the large size of the extruder either result in lack of uniformity of cell diameter or cell distribution, or necessitate use of complicate facilities or skilled manual manipulation for the adjustment of conditions.

If the foamed article is used as a heat insulating material, cushioning material, etc., for example, it is required to be superior in various properties such as cell porosity, recovery from compression, and resistance to heat, compression creep and thermal conductivity. The customary numerical values by which these properties are characterized must exceed certain levels. In this sense, all the extrusion foamed articles obtainable by the existing techniques are not satisfactory. For this reason, the conventional techniques have suffered from a disadvantage that the particular resin subjected to a given extrusion foaming should be selected very strictly so as to meet finely defined use conditions. Foamed articles of a polystyrene resin, for example, have the disadvantage that they are deficient in flexibility and ability to absorb repeated impacts, although they are excellent in compressive strength and thermal insulating property. In the case of an extrusion foamed article of a low-density polyethylene resin, for example, there is a disadvantage that the article is deficient in thermal-insulating property and in resistance to heat and compression creep despite its excellent flexibility and cushioning property. The extrusion foamed article of an ionic copolymer (hereinafter referred to as "ionomer") resin is claimed to excel in cushioning property and yet suffers from the disadvantage that it is deficient in resistance to heat and compression creep, compressive strength, etc. Additionally the extrusion back pressure during extrusion foaming is abnormally high so that the process is not economical.

Numerous researches have been carried out with a view to developing extrusion foamed articles of improved properties by mixing two or more types of synthetic resins to form a basic resin mix and followed by foaming the resultant resin mix. Unfortunately, however, the techniques which have resulted from such researches are unsatisfactory since the resins involved are not sufficiently miscible.

For example, the method disclosed by Japanese Patent Laying-open Nos. 35471/1974 and 25675/1975, namely a method which comprises the steps of preparing a basic resin by use of 60 to 90 parts by weight of a polyolefin resin and 10 to 40 parts by weight of a polystyrene resin, mixing this basic resin with a blowing agent (particularly trichlorofluoromethane) and extrusion foaming the mixture, has the disadvantage that the foaming effected thereby suffers from heavy shrinkage, the method does not permit economic production of a foamed article having large and thick cross section. Moreover, the cushioning property exhibited by the article is too low to be practicable.

The present invention has originated in such status of affairs. Its perfection has resulted from the conception of the combination of resins which show notably inferior compatibility to a combination of polyethylene and polystyrene and which discourage everyone from giving due attention thereto, namely, the organic combination of the requirements indicated below:

An extrusion foamable basic resin mix comprising
(1) A proper amount of an ionomer resin which shows inferior compatibility with polyolefins, and
(2) a proper amount of a styrenic resin which shows inferior compatibility with said polyolefins and said ionomer, and
(3) a selected volatile blowing agent.

An object of the present invention is to provide an economical method for extrusion foaming, which is capable of producing extruded, foamed articles of high quality with large and thick cross sections using an extruder of a small screw diameter.

Another object of the present invention is to provide a novel extrusion foamed article of synthetic resin, novel in the sense that the numerical values of the properties a foamed article is required to possess for use in thermal insulating materials, cushioning materials, etc. invariably exceed certain fixed levels.

Figure 2:
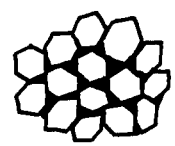
Figure 3:
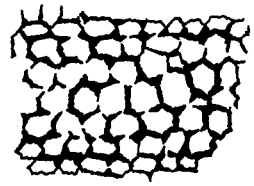
Figure 4:
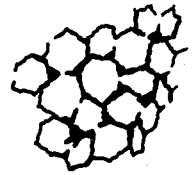

In the accompanying drawings, FIG. 1 shows a schematic drawing of the distribution of cells of the product of this invention;

FIG. 2 an enlarged view of FIG. 1;

FIG. 3 a schematic drawing of the distribution of cells in the product of prior art; and FIG. 4 an enlarged view of FIG. 3.

To accomplish the objects described above, according to the present invention, the present invention provides a process for producing a foamed article of synthetic resin, which comprises blending 100 parts by weight of a molten resin mixture consisting of 10 to 90 weight percent of ionomer resin and 90 to 10 weight percent of a styrenic synthetic resin with 5 to 60 parts by weight of a volatile blowing agent at an elevated temperature under increased pressure, extruding the resultant mixture into a zone of a pressure not higher than atmospheric pressure, thereby allowing the extrudate to expand.

An essential requirement for the present invention is the use, as one component of the basic resin, an ionomer resin, and as the other component thereof a styrenic resin. This particular combination of the components has been singled out on a very strict criterion from among a host of possible combinations of synthetic resins. Especially when the compatibility is taken into account, it is surprising that the two components mix so thoroughly with each other as to give rise to an extrusion foamed article of uniform texture and, moreover, that the resin blend resulting from said mixture manifests improved extrusion foaming properties.

The ratio of the ionomer to styrenic resin for this invention is 10 to 90 percent, preferably 30 to 90 percent, of the ionomer resin to 90 to 10 percent, preferably 70 to 10% of the styrenic resin. If the proportion of the ionomer resin exceeds the upper limit of 90 percent, the back pressure during extrusion abnormally increases to the extent that the commercial production of extrusion foamed articles is impractical unless the volume of extrusion is lowered or a pressure proof extruder of a special design is employed. If the proportion of the ionomer resin does not exceed the lower limit of 10 percent, the quality of the styrenic resin predominates over that of the ionomer resin and the compatibility between the components is adversely affected, with the result that the extrusion foaming properties of the resin blend are degraded.

As measured in terms of the cross section of extrusion foamed article prepared under the optimum conditions of a given extruder, the moldability improved by the blending of the two components mentioned above is about five times as large as that obtained in the extrusion of a low-density polyethylene resin and about two times as large as that obtained in the extrusion of a styrenic resin. Further, by back pressure involved in the extrusion by the method of this invention is 40 to 60 percent less than that involved in the extrusion of the ionomer resin.

The term "ionomer resin" as used in the present invention refers to a copolymer which is obtained when represented by the following generic formula:

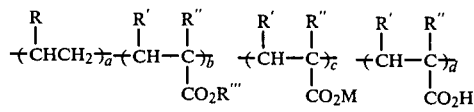

wherein R denotes hydrogen atom or an alkyl group; each of R' and R" denotes hydrogen atom or a methyl group; R''' denotes a lower alkyl group such as methyl, ethyl or propyl; M denotes a metal as is described below, and a, b, c and d denote mol percentages of the respective monomers in the copolymer, and a is 50 mol % or more, b, c and d are determined from neutrality N which is 60 mol percent or less and the saponification degree which is 50 mol percent or more.

With respect to the ionomer resin of the foregoing description, the neutrality N and the saponification degree S will be as defined below.

$$N \text{ (mol percent)} = \frac{c}{c + d} \times 100$$

$$S \text{ (mol percent)} = \frac{c + d}{b + c + d} \times 100$$

In the present invention, the extrusion foamed article produced is characterized by discrete cells of a uniform size more readily when the neutrality N of the copolymer in use does not exceed 60 percent. More preferably, N is in the range from 10 to 40 percent. The saponification degree S is only required to exceed 50 percent. For the copolymer to enjoy uniform foaming more readily, however, the saponification degree of the copolymer in use is desired to be from 70 to 100 percent.

The sum of c+d is preferably in the range of from 0.2 to 25 mol percent, most preferably in the range of from 1 to 10 mol percent.

The ionomer resin, in its solid state, is ionically crosslinked. When it is brought into a molten state, said crosslinks will disappear or decrease in number. When it is brought back into its solid state, it is ionically crosslinked again.

The metal ion component of said copolymer, is the ion of any of the metals, 1 to 3 in valency, belonging to groups I, II, III, IV-a and VIII in the Periodic Table of Elements. Examples of the monovalent metal ions include $Na^+$, $K^+$, $Li^+$, $Ag^+$ and $Cu^+$. Examples of the divalent metal ions include $Be^{++}$, $Mg^{++}$, $Ca^{++}$, $Sr^{++}$, $Ba^{++}$, $Cu^{++}$, $Cd^{++}$, $Sn^{++}$, $Pb^{++}$, $Fe^{++}$, $Co^{++}$, $Ni^{++}$ and $Zn^{++}$. And examples of the trivalent metal ions include $Sc^{+++}$, $Fe^{+++}$ and $Yt^{+++}$. For the purpose of the present invention, the metal ion is desired to be $Na^+$, $Zn^{++}$, or $Ca^{++}$.

The processes disclosed in U.S. Pat. Nos. 3,264,272 and 3,789,035 can be applicable for preparation of the ionomers as mentioned above. Accordingly, the contents of these patents are herein incorporated by reference, although the preparation methods are not limited thereto.

The ionomer resin, in its solid state, retains an ionic crossed linkage. When it is brought into a molten state, said crossed linkage ceases to exist or decreases. When it is brought back into its solid state, it regains said crossed linkage.

The value of the MI (as determined by the method, Condition E, specified by ASTM-D-1238-70) of the ionomer resin is from 0.1 to 50 g/10 minutes. The copolymer produces uniform foaming more readily when the MI thereof is from 0.3 to 10 g/10 minutes, most preferably from 0.3 to 2.9 g/10 minutes.

When the MI exceeds the upper limit 50 g/10 minutes, the extrusion foamed article produced from the copolymer does not have discrete cells of a uniform size and consequently suffers from degradation of both compressive strength and cushoning property. The extrusion foamed article likewise, does not have discrete cells of a uniform size when the MI of the copolymer does not reach the lower limit 0.1 g/10 minutes.

The term "styrenic resin" as used in the specification and claims refers to a synthetic polymeric resin containing at least 20 wt.% of styrene or styrene derivative. The following groups of polymeric resins are included:
(1) homopolymers of styrene or styrene derivative such as 2-methyl styrene, (o-, m-, p-) methyl styrene or aromatic styrene;
(2) copolymers of styrene or styrene derivative with other comonomers such as a vinyl monomer (e.g. methyl methacrylate, acrylonitrile, etc.) or a conjugated diene monomer (e.g. butadiene);
(3) rubber-reinforced styrene polymers or copolymers.

Typical examples of such polymers include polystyrene, styrene-acrylonitrile copolymer and styrene-maleic anhydride copolymer, so called high-impact polystyrene and high-impact acrylonitrile-butadiene-styrene copolymer (ABS resin).

It has been confirmed that an extrusion foamed article of thermoplastic resin containing uniform, discrete cells and excelling in compressive strength, and in cushioning and foaming properties is obtained when there is used a styrenic resin containing 3 to 80 weight percent, preferably 5 to 50 weight percent, of a rubbery substance.

The rubber-reinforced resin used for the present invention is a thermoplastic resin which contains either a diene-type monomer or polymer. Examples of the resin are resins such as styrene-butadiene block copolymers (e.g. so called thermoplastic) and styrene-butadiene random copolymers which are obtained by the chemical reaction of a styrene monomer or polymer with a diene-type monomer or polymer, mechanically mixed resins consisting of styrene homopolymers or styrene-based copolymers and diene-type polymers having a rubbery state at normal room temperature. These resins may be used singly or in the form of mixtures.

As to the melt flow property of the styrenic resin used for the present invention, the MI of said resin is is from 0.3 to 30 as determined by the method, Condition G, specified by ASTM-D-1238-70.

Selection of the blowing agent for use in the present invention is also important. The selection can advantageously be made by taking into account the K.B value which will be defined below. Generally, there is used a volatile blowing agent having a K.B value of not more than 25 and a boiling point of not more than 90° C. under normal pressure. The upper limit 25 of the K.B value is critical because the desired extrudability properties are not obtained when a volatile blowing agent having a K.B. value exceeding 26 is used alone. Concrete examples of such volatile blowing agents are dichlorodifluoromethane (hereinafter referred to as F-12) (K.B value 18, boiling point −29.8° C. under normal pressure), monochlorodifluoromethane (hereinafter referred to as F-22) (K.B value 25, boiling point −40.8° C.), dichlorotetrafluoroethane (hereinafter referred to as F-114) (K.B value 12, boiling point 3.8° C.), propane (K.B value 23, boiling point −42.1° C.) and butane (K.B value 24, boiling point −0.5° C.). These volatile blowing agents may be used either singly or in the form of mixtures consisting of two or more members.

In order to obtain favorable properties of the extrusion foamed article, it is preferred to use a mixture which consists of 20 to 90 weight percent of at least one member selected from the group of volatile blowing agents having K.B values of not more than 25 (hereinafter referred to as "group I") and 80 to 10 weight percent of at least one member selected from the group of volatile blowing agents having K.B values of not less than 26 and boiling points of not more than 90° C. under normal pressure (hereinafter referred to as "group II"). Although the mixing ratio of these groups I and II is variable with the properties of the particular agents to be actually used, it constitutes an essential requirement for perfect accomplishment of the objects of the present invention.

Concrete examples of volatile blowing agents of said group II include trichloromonofluoromethane (hereinafter referred to as F-11) (K.B value 60, boiling point 23.8° C. under normal pressure), dichloromonofluoromethane (hereinafter referred to as F-21) (K.B value 102, boiling point 8.9° C.), trichlorotrifluoroethane (hereinafter referred to as F-113) (K.B value 32, boiling point 47.6° C.), methyl chloride (hereinafter referred to as "MeCl") (K.B value 80, boiling point −23.6° C.), methylene chloride (hereinafter referred to as "MeCl$_2$") (K.B value 136, boiling point 40° C.), pentane (K.B value 127, boiling point 36.1° C.) and hexane (K.B value 30, boiling point 68.8° C.).

The amount of the blowing agent to be used in the present invention is generally in the range of from 5 to 60 parts by weight, preferably from 5 to 35 parts by weight based on 100 parts by weight of the basic resin. It is selected so as to satisfy the foaming ability of the blowing agent and the bulk density which the finally produced foamed article is intended to possess.

If the amount of the volatile blowing agent is not at least 5 parts by weight based on 100 parts by weight of the basic resin, then the foamed article does not form uniform cells. If it exceeds 60 parts by weight, then during continuous foaming operations, the cells rupture, making the continued production of extrusion foam having discrete cells of a uniform size impossible.

The basic resin of the present invention, may have incorporated in its component resins or resin blend an effective amount of a stabilizer serving to retard the detrimental action of heat or light and prevent degradation, an additive useful for enhancing smoothness and impact resistance or a coloring agent. For extrusion foaming, a suitable amount of a substance such as, for example, an inorganic carbonate, organic silicate, inorganic phosphate, metal salt of higher fatty acid, or indigo which is generally used as the nucleating agent, or stabilizing agent may be used for the purpose of adjusting and stabilizing the cell diameter, cell distribution and foaming conditions. Furthermore, other thermoplastic resins such as polyethylene or rubbery substances can also be used as additives, if necessary.

Also for the purpose of adjusting the cell diameter of the foam, an organic nucleating agent (such as, for example, calcium stearate or barium stearate) or an inorganic nucleating agent (such as, for example, talc) may be used in the usual, standard amounts.

For practice of the invention, conventional extrusion foaming techniques may be employed. The operational procedure usually comprises the steps of mixing a basic resin and a volatile blowing agent in an extruder at elevated temperature and pressure, cooling the resultant blend to lower both pressure and temperature to respective levels proper for foaming and subsequently extruding the cooled blend through a die having the desired shape into the atmosphere to thereby cause continuous foaming of the extruded blend.

For uniform dispersion of the volatile blowing agent in the basic resin, it is an absolute necessity that the resin and volatile blowing agent be blended at elevated temperatures under increased pressure within the extruder. Without uniform dispersion, it is hard to obtain good foaming. At low temperatures, there is a possibility that sufficient blending of the resin and the blowing agent will no longer occur. Furthermore, there is also a possibility that the extrudability of the blend will be spoiled. In addition, the uniformity of distribution of cells in the foamed article will be impaired. Accordingly, the properties of the foamed article will be degraded. Further, at low temperatures, since the viscosity of the resin is heightened, it becomes necessary to adopt a complicated and expensive extruder of a special structure capable of withstanding the added load and pressure exerted for the actions of extrusion and blending, rendering the commercial production disadvantageous. Under insufficient pressure, the blowing agent may not be uniformly distributed throughout the resin.

In the method of this invention, the temperature and pressure conditions of the blending within the extruder are selected so that, in the metering zone or mixing zone of the leading-end portion of the extruder in which the resin and the blowing agent are blended more thoroughly than elsewhere, the temperature is 120° to 300° C. and the pressure is from 50 to 250 kg/cm$^2$.

To ensure advantageous foaming, the uniform blend which has been formed under conditions of elevated temperature and pressure must be cooled so that its temperature and pressure will both be lowered to levels proper for the desired foaming.

If the blend is extruded in its uncooled state into the atmosphere, there is a fair possibility that the blend will suffer from impaired extrudability and resulting shrinkage of foamed article, loss of surface smoothness and failure to keep a desired shape. There is also a possibility that the individual cells will be heavily ruptured to greatly degrade various properties of the foamed articles. If the blend is maintained under increased pressure, it is extremely difficult to provide desired foaming of the blend and the individual cells will be heavily ruptured. If the pressure exerted on the blend is excessively lowered immediately before the blend is extruded into the atmosphere, the individual cells will be ruptured to a notable extent. To be more specific, if the extrusion foaming is carried out under a pressure lower than the pressure required for liquefying the blowing agent contained in the blend, foaming occurs within the foaming unit before the blend is released into the atmosphere, making it difficult to improve the extrudability of the blend, and provide uniform distribution of discrete cells in the foamed article through unilization of the latent heat of evaporation involved when the blowing agent is vaporized. Consequently, the foamed article will not have uniform cell distribution and the individual cells will readily be ruptured.

In the practice of the method of this invention, the temperature of the blend just prior to release from the foaming unit into the atmosphere is from 70° to 110° C., preferably from 85° to 100° C. Desirably a rotary temperature regulator may be disposed between the extruder and the die so as to enable the temperature and pressure of the blend to be adjusted to proper levels for extrusion foaming.

If, in the method of this invention, there is used a chemical blowing agent (such as, for example, azodicarbonamide) which liberates upon thermal decomposition a foaming gas such as nitrogen or carbon dioxide which has a very low boiling point and is difficultly miscible with the basic resin, it becomes difficult to maintain a pressure proper for foaming at the temperature proper for the foaming of the resin, and the blowing agent itself tends to vaporize within the foaming unit before the blend is released into the atmosphere. Consequently, reliable foaming will no longer take place, and the distribution of cells in the foamed article will not be uniform. Therefore, such a chemical blowing agent is excluded from the scope of the invention.

In the method of this invention the temperature of the blend is selected to be from 70° to 110° C. immediately before extrusion foaming. No other method so far developed for the manufacture of a thermoplastic resin foamed article permits such a broad temperature range. This unexpectedly broad temperature range facilitates commercial production of the foam.

In the practice of the method of this invention, the blend may be simply released into the atmosphere. When necessary, however, there may be adopted a special device which is capable of keeping the released blend under decreased pressure to the lower limit of 0.2 atm.

According to preferred embodiments, extrusion is performed under conditions such that the extrudate has a thickness of from 0.5 to 100 mm, preferably from 2 to 50 mm and an expansion ratio of from 2 to 50 to produce a foamed article having a thickness of from 1 to 1000 mm, preferably from 20 to 1000 mm.

The foamed article obtained according to the process of the present invention is found to be superior in having well balanced properties and therefore can be used for many purposes. Typically, foamed articles having thickness of 20 mm to 1000 mm, preferably 30 to 500 mm, and bulk density of 20 to 50 Kg/m$^3$ produced from a resinous mixture consisting of 40 to 70 wt.%, preferably 45 to 60 wt.%, of an ionomer resin and 60 to 30 wt.%, preferably 55 to 40 wt.% of a styrenic resin containing at least 70 wt.% of styrene or styrene derivative are unexpectedly found to have have all of the following properties: (as measured by the methods as hereinafter described)

(a) compression strength ranging from 2 to 4 Kg/cm$^2$;

(b) compression recovery ranging from 80 to 99%;

(c) maximum deceleration ranging from 100 to 50 G; and (d) heat transfer ratio ranging from 0.031 to 0.020 Kcal/m.hour.° C.

Furthermore, under most favorable conditions, the product can be provided with compression strength ranging from 3 to 4 Kg/cm$^2$, compression recovery ranging from 90 to 99%, maximum deceleration ranging from 90 to 50 G and heat transfer ratio ranging from 0.030 to 0.020.

The terms used in the specification and claims now be defined. The method of the present invention will be described in further detail with reference to preferred embodiments and comparative examples.

(a) Bulk density (kg/m$^3$)

This is expressed by the value resulting from the division of the weight of the extrusion foamed article by the volume thereof. This magnitude is of a nature such that the degree of foaming obtained in the product increases in reverse proportion to said value.

(b) Mean cell diameter (mm)

This is expressed by the average value of the diameters of all the cells contained within a 100-cm$^2$ cross section of the foamed article.

(c) Compression recovery (%)

This is expressed by the value calculated from the formula of $l_0/l \times 100$, of which the variables $l_0$ and $l$ are determined by an experiment comprising the steps of pressing a foamed article measuring 50 mm×50 mm×50 mm for an interval of 0.5 second under the conditions of normal room temperature, 2 m per second of deformation rate and 50 kg/cm$^2$ of stress until 80% of the original wall thickness ($l_0$) of said foam is evenly compressed, allowing the compressed foam to stand at normal room temperature for a total of 24 hours and finally measuring the wall thickness ($l$) of the foam.

(d) Resistance to heat and compression creep (%)

This is expressed by the value calculated from the formula $(l_0-l_1/l_0) \times 100$, of which the variables $l_0$ and $l_1$ are determined as in the preceding experiment on the compressive recovery and in a subsequent experiment comprising the steps of applying to the specimen foamed article which has undergone said preceding experiment a static compressive load of 0.1 kg/cm$^2$ at a controlled temperature of 60° C. evenly in the same direction in which the foamed article was pressed in the preceding experiment, allowing the foamed article to stand under the applied load for a total of 24 hours and measuring the thickness ($l_1$) of the foamed article at the end of the standing.

(e) Compression strength (kg/cm$^2$)

This is expressed by the value of stress which is exhibited when an extrusion foamed article measuring 50 mm × 50 mm × 50 mm is pressed at a deformation rate of 12.5 mm per minute to 25% of the original thickness. Measurements are carried out in the vertical, parallel and horizontal directions. The largest value is determined as the compression strength.

(f) Maximum deceleration (G)

This is expressed by the value which is obtained by dividing the maximum acceleration registered on the accelerometer by the gravitational acceleration; the maximum acceleration is to be obtained in an experiment in which a flat 20 cm$^2$ slab weighing 10 kg and provided with an accelerometer is dropped onto a rectangular foamed article measuring 14.6 cm$^2$ in area and 3 cm in thickness from the height of an effective length of 60 cm in such way that the slab will exert an even force on the surface of the article in the direction of thickness.

(g) Thermal conductivity (Kcal/m.hour.°C.)

This value is obtained by measurements carried out in accordance with the method specified in ASTM-C-177.

(h) Cell porosity (%)

A foamed article is kept under reduced pressure of 300 mmHg at normal room temperature for ten minutes. The article, in its unaltered form, is submerged in an aqueous 3% polyethylene glycol (surface active agent) solution and left to stand therein for ten minutes. Then, it is removed from the solution and wiped to dry the surface and weighed. (Let $W_1$ stand for the weight thus found.) Let ($W_0$) and ($V_F$) stand for the weight and volume of the article prior to exposure to said reduced pressure. Then the cell porosity is expressed by the formula, ($W_1-W_0/V_F$)×100. This value is such that the proportion of discrete cells increases in inverse proportion to the value. Accordingly, the suitability of the article as a cushioning material or heat-insulating material increases as the value decreases.

(i) Shrinkage (%)

It represents the degree of dimensional stability of the extrusion foamed article at the time of extrusion foaming. When the actual dimensions of the extrusion foamed article approach the target dimensions, the workability of the foam improves, and the value decreases.

This is expressed by the value calculated from the formula, $(B_0-B_1/V_0) \times 100$, and corresponds to the difference between the volume of the foamed article ($B_0$) measured two minutes after extrusion foaming and the volume ($B_1$) measured after an interval of three days.

(j) Cross sectional area (cm$^2$)

This is expressed by the area of the cross section of the foamed article which is obtained when a foamable resin gel is extruded through a nozzle, 3.5 mm in diameter, attached to the leading end of an extruder 30 mm in screw diameter with an extruding capacity of 3.8 kg/hour into a zone of atmospheric pressure. The foamable resin gel is prepared by mixing 100 parts by weight of basic polymer with 21 parts by weight of a blowing agent with a view to uniformizing the bulk density to the fullest possible extent.

(k) Kauri-Butanol (K.B) value

This is measured by the method of ASTM-D-1133-61.

The ionomer resins used in the preferred embodiments of this invention and the comparative examples were experimental products (A through L) prepared by Asahi-Dow Limited. In each product, A through J, the acid component is methacrylic acid. The products K and L contain methacrylic as acid the acid component and methyl methacrylate as the ester component. Typical numerical values for certain of their properties are shown in Table 1.

Table 1

| Properties | Sample No. for trially produced ionomer | | A | B | C | D | E | F | G | H | I | J | K | L |
|---|---|---|---|---|---|---|---|---|---|---|---|---|---|---|
| MI | ASTM D-128-62T | g/10 min. | 0.1 | 0.35 | 0.56 | 1.20 | 1.24 | 1.91 | 2.90 | 3.10 | 4.68 | 5.44 | 0.7 | 1.5 |
| Density | ASTM D-1905 | g/cm$^3$ | 0.948 | 0.951 | 0.965 | 0.942 | 0.950 | 0.947 | 0.956 | 0.945 | 0.956 | 0.938 | 0.947 | 0.949 |
| Na content | — | wt. % | 0 | 2.18 | 0 | 1.31 | 1.34 | 0 | 0 | 0.60 | 2.10 | 0 | | 1.8 |
| Zn content | — | wt. % | 3.10 | 0 | 3.48 | 0 | 0 | 0.90 | 0.80 | 0 | 0 | 0.50 | | |
| Ca content | — | wt. % | | | | | | | | | | | 2.8 | |
| Neutrality | — | % | 44.1 | 43.8 | 44.0 | 35.0 | 26.8 | 15.3 | 19.5 | 16.2 | 39.6 | 10.3 | | |
| N | — | | | | | | | | | | | | 50 | 45 |
| Saponification degree | — | % | 100 | 100 | 100 | 100 | 100 | 100 | 100 | 100 | 100 | 100 | 75 | 58 |
| S | | | | | | | | | | | | | | |

EXAMPLE 1 AND COMPARATIVE EXAMPLE 1:

Six types of ionomer resins A, E, G, H, I and J and three types of polystyrene resins Styron 680 (MI 8.0), Styron 666 (MI 7.0), and Styron 679 (MI 25.5) were mixed in the combinations and at the percent compositions indicated in Table 2 to prepare basic resins. From each of the basic resins were prepared a mixed resin by dry blending 100 parts by weight of the basic resin with 0.5 part by weight each of talc and zinc stearate. Styron was provided by Asahi-Dow. The word is a registered Trade Mark of that company for their brand of polystyrene.

The mixed resin was fed through a resin inlet into an extruder (30 mm in screw diameter) having the first zone maintained at 125° C. and the second and third zones each at 190° C., causing the resin to be melted and kneaded. Through a blowing agent inlet disposed in the neighborhood of the starting point of the third zone of the extruder, a blowing agent prepared separately (by mixing 80 parts by weight of dichlorodifluoromethane with 20 parts by weight of methylene chloride) was introduced under increased pressure at a rate of 21 parts by weight of blowing agent per 100 parts by weight of basic resin, allowing the blowing agent to be dispersed in said molten resin. The pressure under which the introduction of blowing agent was effected in this case (corresponding to the back pressure of the extruder) was found to be from 105 to 115 kg/cm². The molten resin flowed through the cooling and kneading zones and consequently had its temperature adjusted to about 100° C. Then, it was extruded through a nozzle 3.5 mm in diameter into an atmosphere zone at an extrusion capacity of 3.8 kg/hour to produce an extrusion foamed article.

The article thus produced was examined to rate the extrudability of the corresponding basic resins. The results of the rating were as shown in Table 2. In Table 2, the basic resins (composed of ionomer and polystyrene resins) having polystyrene resin contents in the range of from 10 to 70 percents are indicated as belonging to Example 1 and those having polystyrene resin contents of 5 and 95 percents as belonging to Comparative Example 1 respectively.

Table 2

| Classification | Item | Ionomer/ polystyrene combination in basic resin | Polystyrene content (by weight percent) in basic resin | Bulk density (kg/m³) | Mean cell diameter (mm) | Shrinkage (%) | Cross sectional area (cm²) | Foaming |
|---|---|---|---|---|---|---|---|---|
| Example 1 | | E/680 | 10. | 26.9 | 0.5 | 1.80 | 8.2 | |
| | | " | 30. | 26.0 | 0.6 | 1.00 | 9.8 | |
| | | " | 50. | 38.4 | 0.5 | 0.60 | 9.0 | |
| | | " | 70. | 35.0 | 0.4 | 0.20 | 8.1 | |
| | | E/666 | 50. | 36.4 | 0.3 | 2.20 | 10.0 | |
| | | E/679 | 50. | 43.5 | 0.6 | 1.20 | 10.8 | Good surface smoothness and uniform foaming |
| | | A/680 | 50. | 36.2 | 0.5 | 0.80 | 10.5 | |
| | | G/680 | 50. | 38.1 | 0.6 | 0.90 | 9.2 | |
| | | J/680 | 50. | 37.7 | 1.1 | 2.12 | 12.8 | |
| | | I/680 | 50. | 38.7 | 1.0 | 2.70 | 12.2 | |
| | | H/680 | 50. | 37.6 | 0.8 | 2.31 | 10.5 | |
| Comparative Example 1 | | E/680 | 5. | 36.5 | 1.1 | 3.20 | 5.5 | Rather poor surface smoothness and non-uniform foaming |
| | | E/680 | 95. | 37.2 | 1.1 | 5.20 | 4.9 | |

EXAMPLE 2 AND COMPARATIVE EXAMPLE 2

These examples were carried out by following the procedure of Example 1, except the ionomer resin E and a styrene-butadiene copolymer (butadiene content 8 weight percent, MI 7.0 g/10 minutes) were used in the amounts indicated in Table 3.

Table 3

| Classification | Item | Amount of styrene butadiene copolymer (wt. %) | Bulk density (kg/m³) | Mean cell porosity (mm) | Shrinkage (%) | Cross sectional area (cm²) | Foaming |
|---|---|---|---|---|---|---|---|
| Example 2 | | 15 | 31.0 | 0.5 | 1.70 | 8.2 | Good surface smoothness and uniform foaming |
| | | 40 | 34.2 | 0.6 | 0.30 | 11.9 | Good surface smoothness and uniform foaming |
| | | 80 | 35.4 | 0.8 | 1.80 | 10.1 | Good surface smoothness and uniform foaming |
| Comparative Example 2 | | 5 | 32.1 | 1.1 | 3.10 | 5.2 | Slightly poor surface smoothness and non-uniform foaming |
| | | 95 | 36.0 | 1.2 | 4.10 | 5.1 | Slightly poor surface smoothness and non-uniform foaming |

EXAMPLE 3 AND COMPARATIVE EXAMPLE 3

The procedure of Example 1 was repeated, except that a mixed resin consisting of 50 weight percent of ionomer resin E and 50 weight percent of polystyrene resin [Styron (trade mark) 680] was used as the basic resin and dichlorodifluoromethane (F-12) alone, propane alone, a 50/50 (by weight ratio; the same applicable hereinafter) mixture of F-12/methyl chloride (MeCl), a 50/50 mixture of propane/methyl chloride and a 75/25 mixture of F-12/methylene chloride (MeCl$_2$) (belonging to Example 3), methylene chloride alone, trichloromonofluoromethane (F-11) alone and pentane alone (belonging to Comparative Example 3) were used as the blowing agent in the basic resin. The extrusion foamed articles thus obtained were examined to rate the extrudability of the corresponding basic resins at the time of extrusion. The results of the rating were as shown in Table 4.

The pressure under which the blowing agent was introduced were from 105 to 115 kg/cm$^2$.

Table 4

| Classification | Item Composition of blowing agent | Percent composition of blowing agent (wt. %) | Bulk density (kg/m$^3$) | Mean cell diameter (mm) | Cell porosity (%) | Shrinkage (%) | Cross sectional area (cm$^2$) | Foaming |
|---|---|---|---|---|---|---|---|---|
| Example 3 | F-12 | 100 | 36.6 | 0.3 | 8.54 | 1.39 | 8.7 | Good surface smoothness and slightly un-uniform foaming |
| | Propane | 100 | 35.9 | 0.4 | 2.38 | 0.79 | 8.7 | |
| | F-12/MeCl | 50/50 | 37.3 | 0.3 | 30.19 | 0.88 | 6.2 | |
| | Propane/MeCl | 50/50 | 49.7 | 0.8 | 4.50 | 2.87 | 7.9 | |
| | F-12/MeCl$_2$ | 75/25 | 37.0 | 0.3 | 0.10 | 2.05 | 10.0 | Good surface smoothness and uniform foaming |
| Comparative Example 3 | MeCl$_2$ | 100 | 89.1 | Incapable of measurement | Incapable of measurement | 83.50 | 1.8 | Inferior surface smoothness and non-ununiform foaming |
| | F-11 | 100 | 80.5 | Incapable of measurement | Incapable of measurement | 76.56 | 2.3 | |
| | Pentane | 100 | 87.1 | Incapable of measurement | Incapable of measurement | 81.05 | 1.7 | |

MeCl stands for methyl chloride and MeCl$_2$ for methylene chloride.

EXAMPLE 4 AND COMPARATIVE EXAMPLE 4

Extrusion foamed articles were produced by following the procedure of Example 3 and Comparative Example 3, except 80/20, 75/25, 50/50 and 40/60 mixtures respectively of F-12/MeCl$_2$, 80/20 and 60/40 mixtures respectively of propane/MeCl, a 50/50 mixture of propane/pentane and an 80/20 mixture of F-12/hexane (belonging to Example 4) were used each as the blowing agent. They were examined to rate the extrudability of the corresponding basic resins and were tested for properties. The results were as shown in Table 5. The pressure at which the blowing agent was introduced invariably fell in the neighborhood of 110 kg/cm$^2$.

For reference, molten resins for extrusion were prepared in the percent compositions indicated herein below and they were extruded under the optimum conditions to produce foamed articles. The articles were similarly examined and tested. The results were as shown in Table 5.

The principal conditions involved in the Comparative Example 4 and particular notes are shown below. In each case, the extrusion temperature is kept at about 100° C.

(Sample 1)

Resin used: Ionomer resin [Sample No. C (MI 0.56)] alone
Blowing agent: F-12 alone
Specific conditions:
(1) When the blowing agent was used at a ratio of 21 parts by weight per 100 parts by weight of the resin, the foaming proceeded to the extent of bringing about abnormal expansion. Thus, the amount of the blowing agent was reduced to 11 parts by weight.
(2) When an attempt was made to fix the extrusion volume at 2 kg/hour (target 3.8 kg/hour), there appeared indications of a possibility that the pressure of introduction (corresponding to back pressure) would exceed the critical value of pressure resistance. Thus, the extrusion was performed at a decreased extrusion volume of 1.8 kg/hour. In this case, the pressure of introduction rose to an abnormally high level of 210 kg/cm$^2$.

(Sample 2)

Resin used: Styron 680, alone
Blowing agent: A 40/60 mixture of F-12/MeCl
Specific conditions:
(1) When the blowing agent was used at a ratio of 21 parts by weight per 100 parts by weight of the resin, the foaming proceeded to the extent of bringing about abnormal expansion. Thus, the amount of the blowing agent was decreased to 16 parts by weight. In this case, the pressure for introduction of the blowing agent was 120 kg/cm$^2$.

(Sample 3)

Resin used: Low-density (non-cross-linked) polyethylene resin [M-2125 (trade mark) produced by Asahi-Dow Limited, MI 2.5, density 0.921 g/cc] alone
Blowing agent: Dichlorotetrafluoroethane (F-114) alone
Specific conditions:
(1) When the blowing agent was used at a ratio of 21 parts by weight per 100 parts by weight of the resin, the expansion ratio was not sufficiently high. Thus, the amount of the blowing agent was increased to 24 parts by weight. The pressure for introduction of the blowing agent in this case was 110 kg/cm$^2$.

(Sample 4)

Resin used: A mixed resin consisting of 65 parts by weight of low-density polyethylene resin [Yukalon (trade mark) HE-60 made by Mitsubishi Petrochemical Co.] and 35 parts by weight of polystyrene resin [Styron (trade mark) 679 made by Asahi-Dow Limited]

Blowing agent: F-11 alone

Specific conditions: 100 parts (by weight) of the above resin, 0.5 part of talcum, 0.005 part of polybutene and 24 parts of freon were introduced at 210° C. into an extruder. The pressure for introduction of the blowing agent in this case was 115 kg/cm$^2$.

(Samples 5, 6 and 7)

The procedure for Sample 4 was repeated, except a 50/50 (by weight ratio) mixture of F-11 and butane, a 50/50 (by weight ratio) mixture of F-11 and F-12 and a 50/50 (by weight ratio) mixture of F-11 and propane were used each as the blowing agent at a ratio a 25 parts by weight based on 100 parts by weight of the basic resin. In this case, the pressure of introduction was 105 to 110 kg/cm$^2$.

Table 5

| Classification | Item | Blowing agent composition | Percent composition of blowing agent (wt) | Bulk density (kg/m$^3$) | Mean cell diameter (mm) | Compressive strength (kg/cm$^2$) | Compression recovery (%) | Resistance to heat and compression creep (%) | Maximum deceleration (G) | Thermal conductivity (Kcal/m/hr.°C.) | Cell porosity (%) | Shrinkage (%) | Cross sectional area (cm$^2$) | Foaming |
|---|---|---|---|---|---|---|---|---|---|---|---|---|---|---|
| | | F12/MeCl$_2$ | 80/20 | 38.4 | 0.5 | 3.92 | 95.5 | 3.7 | 73 | 0.0268 | 0.07 | 0.60 | 9.0 | Good surface smoothness and uniform foaming |
| | | F12/MeCl$_2$ | 75/25 | 37.0 | 0.3 | 3.78 | 94.5 | 13.8 | 90 | 0.0267 | 0.10 | 1.65 | 10.0 | Good surface smoothness and uniform foaming |
| | | F12/MeCl$_2$ | 50/50 | 42.0 | 0.9 | 3.89 | 95.0 | 13.5 | 91 | 0.0272 | 0.07 | 1.80 | 11.8 | Good surface smoothness and uniform foaming |
| | | F12/MeCl$_2$ | 40/60 | 42.5 | 0.9 | 2.01 | 82.5 | 19.5 | 95 | 0.0305 | 0.90 | 2.00 | 10.0 | Good surface smoothness and uniform foaming |
| | | F12/F11 | 80/20 | 38.4 | 0.3 | 2.51 | 88.7 | 19.5 | 95 | 0.0260 | 1.03 | 0.01 | 9.3 | Good surface smoothness and uniform foaming |
| | | " | 50/50 | 49.2 | 0.4 | 2.50 | 90.0 | 18.0 | 96 | 0.0265 | 1.01 | 0.01 | 10.5 | Good surface smoothness and uniform foaming |
| Example 4 | | Propane/MeCl$_2$ | 80/20 | 49.7 | 0.8 | 3.60 | 94.0 | 10.1 | 83 | 0.0295 | 0.05 | 0.37 | 9.8 | Good surface smoothness and uniform foaming |
| | | Propane MeCl$_2$ | 60/40 | 38.8 | 0.7 | 3.61 | 94.1 | 10.0 | 80 | 0.0302 | 0.05 | 1.18 | 11.2 | Good surface smoothness and uniform foaming |
| | | Propane/pentane | 50/50 | 40.8 | 0.7 | 3.12 | 96.2 | 9.8 | 83 | 0.0310 | 0.10 | 0.65 | 9.3 | Good surface smoothness and uniform foaming |
| | | F12/Hexane | 80/20 | 49.9 | 0.7 | 3.90 | 91.0 | 18.0 | 75 | 0.0282 | 0.10 | 0.01 | 10.8 | Good surface smoothness and uniform foaming |
| Comparative Example 4 | Sample 1 | F12 | 100 | 34.4 | 0.2 | 1.20 | 99.5 | 59.7 | 87 | 0.0308 | 0.02 | 4.00 | 4.9 | Good surface smoothness and uniform foaming |
| | Sample 2 | F12/MeCl | 40/60 | 30.3 | 0.9 | 5.10 | 48.0 | 66.5 | Min. 140 | 0.0270 | 0.01 | 0.02 | 4.5 | Good surface smoothness and uniform foaming |
| | Sample | | | | | | | | | | | | | Slightly poor |

Table 5-continued

| Classification | Item | Blowing agent composition | Percent composition of blowing agent (wt) | Bulk density (kg/m³) | Mean cell diameter (mm) | Compressive strength (kg/cm²) | Compression recovery (%) | Resistance to heat and compression creep (%) | Maximum deceleration (G) | Thermal conductivity (Kcal/m.hr.°C.) | Cell porosity (%) | Shrinkage (%) | Cross sectional area (cm²) | Foaming |
|---|---|---|---|---|---|---|---|---|---|---|---|---|---|---|
| ple 3 | | F114 | 100 | 38.7 | 0.8 | 1.64 | 97.7 | 27.2 | 94 | 0.0340 | 0.15 | 4.80 | 1.3 | surface smoothness and uniform foaming |
| Sample 4 | | F11 | 100 | 35.2 | 1.1 | 1.80 | 54.2 | 58.1 | Min. 140 | 0.0318 | 8.18 | 10.12 | 1.5 | Slightly poor surface smoothness and slightly uniform foaming |
| Sample 5 | | F11/Butane | 50/50 | 35.8 | 1.6 | 0.95 | 41.8 | 58.6 | Min. 140 | 0.042 | 9.50 | 32.1 | 1.8 | Inferior surface smoothness and un-uniform foaming |
| Sample 6 | | F11/F12 | 50/50 | 32.5 | 0.9 | 0.86 | 38.7 | 66.5 | Min. 140 | 0.045 | 10.05 | 20.5 | 1.9 | Inferior surface smoothness and un-uniform foaming |
| Sample 7 | | F11/Propane | 50/50 | 42.1 | 0.7 | 0.76 | 39.6 | 62.1 | Min. 140 | 0.038 | 15.70 | 19.5 | 2.2 | Inferior surface smoothness and un-uniform foaming |

As is clear from the comparison of Example 4 and Samples 4, 5, 6 and 7 of Comparative Example 4, the foamed articles obtained in Samples 4, 5, 6 and 7 by extruding the corresponding melts into the atmosphere at 23° C. had small cross sectional areas and large percents of shrinkage as compared with those obtained in Example 4. The properties of these articles were too poor to permit them to be used effectively as cushioning material. These degraded properties may possibly be ascribed to the shrinkage which the articles underwent and to opened cells. These foamed articles showed very high degrees of cell porosity possibly because the basic resins contained no ionomer resin and, therefore, the compatibility between polyethylene and polystyrene was not sufficiently high despite the use of suitable blowing agents. This trend toward degradation of properties became conspicuous as the thickness of extrusion foamed article exceeded 10 mm. The state of distribution of the cells in the product of Example 4 and its enlarged view are shown in FIGS. 1 and 2, respectively. For comparison, the state of cells in the product of Sample 5, 6, or 7 and its enlarged view are shown in FIGS. 3 and 4, respectively.

EXAMPLE 5

Foamed articles were produced by repeating the procedure of Example 1, except basic resins were prepared by mixing a total of 10 types of ionomer resins, A through J, each with Styron 680 as the styrene resin, at a ratio of 50/50 and an 80/20 mixture of F-12/MeCl was used as the blowing agent. The extrusion foamed articles were examined to rate the extrudability of the resins and were tested for properties. The results were as shown in Table 6. For reference, the results obtained with respect to aforesaid Samples 1 through 3 of Comparative Example 4 are also given in the same table.

Table 6

| Classification | Item | Type of ionomer resin used in basic resin | MI of ionomer resin | Bulk density kg/m³ | Mean cell diameter (mm) | Compressive strength (kg/cm²) | Compression recovery (%) | Resistance to heat and compression creep (%) | Maximum deceleration (G) | Thermal conductivity (Kcal/m.hr.°C.) | Cell porosity (%) | Shrinkage (%) | Cross sectional area (cm²) | Foaming |
|---|---|---|---|---|---|---|---|---|---|---|---|---|---|---|
| | | F | 1.91 | 35.6 | 0.8 | 3.10 | 91.8 | 16.0 | 99 | 0.0270 | 0.10 | 1.80 | 11.3 | Good surface smoothness |

Table 6-continued

| Classification | Item | Type of ionomer resin used in basic resin | MI of ionomer resin | Bulk density kg/m³ | Mean cell diameter (mm) | Compressive strength (kg/cm²) | Compression recovery (%) | Resistance to heat and compression creep (%) | Maximum deceleration (G) | Thermal conductivity (Kcal/m.hr.°C.) | Cell porosity (%) | Shrinkage (%) | Cross sectional area (cm²) | Foaming |
|---|---|---|---|---|---|---|---|---|---|---|---|---|---|---|
| | | E | 1.24 | 38.4 | 0.5 | 3.92 | 95.5 | 3.7 | 73 | 0.0268 | 0.07 | 0.60 | 9.0 | Good surface smoothness and uniform foaming |
| | | D | 1.20 | 35.7 | 0.5 | 3.17 | 95.0 | 14.0 | 85 | 0.0267 | 0.07 | 1.60 | 9.1 | Good surface smoothness and uniform foaming |
| Example 5 | | C | 0.56 | 37.0 | 0.3 | 3.80 | 95.0 | 8.0 | 79 | 0.0267 | 0.07 | 0.50 | 9.6 | Good surface smoothness and uniform foaming |
| | | B | 0.35 | 36.2 | 0.3 | 3.84 | 94.5 | 14.0 | 90 | 0.0267 | 0.10 | 2.19 | 10.0 | Good surface smoothness and uniform foaming |
| | | J | 5.44 | 37.7 | 1.1 | 1.85 | 56.2 | 61.5 | Min. 140 | 0.0302 | 1.60 | 2.12 | 12.8 | Good surface smoothness and uniform foaming |
| | | I | 4.68 | 38.7 | 1.0 | 1.95 | 60.2 | 59.0 | Min. 140 | 0.0305 | 20.50 | 2.70 | 12.2 | Good surface smoothness and uniform foaming |
| | | H | 3.10 | 37.6 | 0.8 | 2.40 | 61.9 | 58.0 | Min. 140 | 0.0301 | 7.10 | 2.31 | 10.5 | Good surface smoothness and uniform foaming |
| | | A | 0.10 | 36.5 | 0.5 | 3.65 | 96.0 | 10.0 | 79 | 0.0269 | 0.09 | 1.75 | 10.1 | Good surface smoothness and uniform foaming |
| | | G | 2.90 | 38.1 | 0.4 | 3.20 | 88.3 | 18.0 | 99 | 0.0270 | 0.08 | 1.05 | 11.2 | Good surface smoothness and uniform foaming |
| Comparative Example 4 Sample 1 | | Ionomer | — | 34.4 | 0.2 | 1.20 | 99.5 | 59.7 | 87 | 0.0308 | 0.02 | 4.00 | 4.9 | Good surface smoothness and uniform foaming |
| Sample 2 | | polystyrene | — | 30.3 | 0.9 | 5.10 | 48.0 | 66.5 | Min. 140 | 0.0270 | 0.01 | 0.02 | 4.5 | Good surface smoothness and uniform foaming |
| sample 3 | | Low-density polyethylene | — | 38.7 | 0.8 | 1.64 | 97.7 | 27.2 | 94 | 0.0340 | 0.15 | 4.80 | 1.3 | Rather poor surface smoothness |

EXAMPLE 6

A basic resin was prepared by mixing 50 weight percent of ionomer resin (Sample No. C, MI 0.56) and 50 weight percent of an impact-resistant polystyrene resin containing 3 weight percent of polybutadiene (manufactured product by Asahi-Dow Limited). A mixture consisting of 100 parts by weight of said basic resin and 0.5 part by weight of talc and 0.4 part by weight of barium stearate was fed to an extruder having a screw diameter of 30 mm while keeping the first zone at 120° C., the second zone at 210° C. and the third zone at 240° C. Through an inlet disposed in the middle of the third zone of the extruder, a mixed volatile blowing agent consisting of 30 weight percent of dichlorodifluoromethane and 70 weight percent of dichloromonofluoromethane was introduced under increased pressure at a ratio of 31 parts by weight per 100 parts by weight of said basic resin to be blended therewith. The blend was extruded through a die (3 mm in diameter) attached to the forward tip of the temperature adjusting member at a resin temperature of 105° C. into a low-pressure zone at the highest extruding capacity 3.3 kg/hour of the extruder, to undergo extrusion foaming. At this time, the pressure for introduction of the blowing agent was 170 kg/cm$^2$ and the resin pressure immediately in front of the die was 35 kg/cm$^2$.

The bar-shaped foamed article thus obtained had a bulk density of 25 kg/m$^3$, contained uniform, discrete cells and had good surface smoothness. The percent decrease in volume of the foamed article at the end of 48 hours' standing from the time of foaming was 2%, an exceptionally small value. The compressive strength was 1.8 kg/cm$^2$ and the maximum deceleration was 65 G.

EXAMPLE 7

The procedure of Example 6 was repeated, except a styrenebutadiene block copolymer containing 70 weight percent of butadiene was used in place of the impact-resistant polystyrene containing polybutadiene. In this case, the pressure for introduction of the blowing agent was 150 kg/cm$^2$ and the pressure of the resin immediately in front of the die was 31 kg/cm$^2$.

The bar-like foamed article thus produced showed a bulk density of 35 kg/m$^3$, contained uniform, discrete cells and had slightly coarse surface. The percent decrease in volume of the foamed article at the end of 48 hours' standing from the time of foaming was 5%. The article showed a compressive strength of 1.2 kg/cm$^2$ and a maximum deceleration of 51 G, indicating that it excelled in cushioning property.

EXAMPLES 8–14 AND COMPARATIVE EXAMPLES 5–6

As the ionomer resin, there were used Sample No. C (MI 0.56) and Sample No. D (MI 1.2) and Sample No. K (Ca as metal, MI 0.7, S=75%, N=50%) and Sample No. L (Na as metal, Mi 1.5, S=58%, N=45%). As the rubbery substance-containing thermoplastic resin, there were used a polystyrene resin containing 3 weight percent of polybutadiene (hereinafter abbreviated as "X"), a polystyrene resin containing 18 weight percent of polybutadiene (hereinafter abbreviated as "Y") and a mixed resin consisting of 20 parts by weight of polystyrene resin, Styron (trade mark) 680, produced by Asahi-Dow Limited and 80 parts by weight of polybutadiene rubber, Diene (trade mark) produced by Asahi Chemical Industry Co., Ltd. (hereinafter abbreviated as "Z"). They were mixed at the ratios indicated in Table 1 to prepare basic resins. Then, the procedure of Example 7 was repeated, except the aforementioned basic resins were used and the blowing agents prepared by mixing F-12, F-21, F-11, F-114 and MeCl$_2$ at the ratios indicated in Table 7 were used as the volatile blowing agent.

Table 7

| Example | Resin composition Ionomer resin | wt % | Rubbery substance-containing resin | wt % | Blowing Agent composition Group I | wt % | Group II | wt % | Extrudability Surface and cell conditions | Shrinkage (vol. %) | Physical properties Bulk density (kg/m$^3$) | Compressive strength (kg/cm$^2$) | Maximum deceleration (G) |
|---|---|---|---|---|---|---|---|---|---|---|---|---|---|
| 8 | C | 90 | X | 10 | F12 | 30 | F21 | 70 | Smooth surface and uniform, discrete cells | 3 | 21 | 1.9 | 58 |
| 9 | " | 10 | X | 90 | " | " | " | " | Slightly creased surface and uniform, discrete cells | 7 | 35 | 3.1 | 92 |
| 10 | " | 50 | Y | 50 | " | 80 | MeCl$_2$ | 20 | Smooth surface and uniform, discrete cells | 2 | 25 | 2.6 | 62 |
| 11 | D | 30 | " | 70 | " | 30 | F11 | 70 | Smooth surface and uniform, discrete cells | 2 | 28 | 2.8 | 75 |
| 12 | K | 70 | " | 30 | " | " | F21 | " | Smooth surface and uniform, discrete cells | 3 | 19 | 2.1 | 52 |
| 13 | L | " | " | " | F114 | " | " | " | Smooth surface and uniform, discrete cells | 5 | 23 | 2.3 | 62 |
| 14 | C | " | Z | " | " | " | " | " | Slightly creased surface and uniform, discrete cells | 18 | 48 | 2.7 | 61 |
| Comparative Example 5 | C | 5 | Y | 95 | F12 | 30 | F21 | 70 | Heavily creased surface and non-uniform cells | 30 | 61 | 1.1 | Min. 140 |

Table 7-continued

| | Resin composition | | | | Blowing Agent composition | | | | Extrudability | | Physical properties | | |
|---|---|---|---|---|---|---|---|---|---|---|---|---|---|
| | Ionomer | | Rubbery substance-containing | | | | | | Surface and | Shrink- | Bulk density | Compressive strength | Maximum deceleration |
| Example | resin | wt % | resin | wt % | Group I | wt % | Group II | wt % | cell conditions | age (vol. %) | (kg/m³) | (kg/cm²) | (G) |
| ple 6 | " | 95 | " | 5 | " | " | " | " | Smooth surface and non-uniform cells | 5 | 38 | 0.3 | 65 |

The present invention permits an extrusion foaming of thermoplastic synthetic resin to be accomplished with enhanced efficiency. For example, this invention is effective in preventing the resin from being expanded or shrunken at the time of extrusion, improving the extrusion foamed article in terms of cross section and keeping the extrusion back pressure from abnormally increasing and, consequently, brings about an effect of improving the economy of the extruding and foaming steps. In addition, this invention permits economically advantageous production of a novel resin foamed article capable of satisfying the various properties such as compression strength and recovery, cushioning property, and thermal insulating property all at once.

What we claim is:

1. A foamed article having a bulk density from 15 to 200 Kg/m³ comprising a foamed resinous composition containing 10 to 90 weight percent of an ionomer resin having a melt index of from 0.1 to 50 g/10 min. and 90 to 10 weight percent of a styrenic synthetic resin.

2. A foamed article as claimed in claim 1 having a bulk density from 20 to 50 Kg/m³ containing 40 to 70 weight percent of ionomer resin and 60 to 30 weight percent of styrenic synthetic resin, the said styrenic synthetic resin containing at least 70 weight percent of a member selected from the group consisting of styrenic and styrene derivatives, said foamed article having a thickness of from 20 mm to 1000 mm and the following properties:
   a. Compression strength from 2 to 4 Kg/cm²;
   b. Compression recovery from 80 to 99%;
   c. Deceleration from 100 to 50;
   d. Heat transfer ratio from 0.031 to 0.020 Kcal/m.-hour° C.

3. A process for producing a foamed article which comprises blending 10 to 90% by weight of an ionomer resin having a melt index from 0.1 to 50 g/10 min. and 90 to 10% by weight of a styrenic synthetic resin, and mixing 100 parts by weight of the resulting blend in the molten state with 5 to 60 parts by weight of a volatile blowing agent, having a Kauri-butanol value up to 25, in an extruder at high temperature and pressure, and extruding the resulting blended mixture into a zone kept under a pressure which is not higher than atmospheric pressure, thereby allowing the extrudate to expand.

4. A process as in claim 3 employing 30 to 90 weight percent of an ionomer resin and 70 to 10 weight percent of a styrenic synthetic resin.

5. A process as in claim 3 wherein the styrenic synthetic resin is polystyrene.

6. A process as in claim 3 wherein the styrenic synthetic resin contains 3 to 80 weight percent of a rubbery substance.

7. A process as in claim 3 wherein the melt index of the styrenic synthetic resin is from 0.3 to 30 g/10 min.

8. A process as in claim 3 wherein the melt index of the ionomer resin is from 0.3 to 10 g/10 min.

9. A process as in claim 3 wherein the melt index of the ionomer resin is from 0.3 to 2.9 g/10 min.

10. A process as in claim 3 wherein the volatile blowing agent is a mixture containing:
    1. 20 to 90 weight percent of at least one member selected from the group consisting of volatile blowing agents having Kauri-butanal values up to 25 and normal boiling points up to 90° C., together with
    2. 80 to 10 weight percent of at least one member selected from the group consisting of blowing agents having Kauri-butanal values of at least 26 and normal boiling points up to 90° C.

11. A process as in claim 3 wherein the blended mixture is extruded at a temperature of from 70° C. to 100° C.

12. A process as in claim 10 wherein the blended mixture is extruded at a temperature of from 85° C. to 100° C.

13. A process as in claim 3 wherein the extrudate has a thickness of from 0.5 mm to 100 mm, and is allowed to expand to an expansion ratio of from 2 to 50 to produce a foamed article having a thickness of from 1 mm to 1000 mm.

14. A process as in claim 13 wherein the thickness of extrudate is from 2 mm to 50 mm and the thickness of the foamed article is from 20 mm to 1000 mm.

* * * * *